United States Patent [19]
Citta

[11] Patent Number: 5,602,583
[45] Date of Patent: Feb. 11, 1997

[54] NTSC REJECTION FILTER WITH SWITCHED TOMLINSON PRECODER FOR REDUCING NTSC CO-CHANNEL INTERFERENCE IN ATV RECEIVERS

[75] Inventor: Richard W. Citta, Oak Park, Ill.

[73] Assignee: Zenith Electronics Corporation, Glenview, Ill.

[21] Appl. No.: 386,589

[22] Filed: Feb. 10, 1995

[51] Int. Cl.⁶ ................................................... H04N 5/38
[52] U.S. Cl. ........................ 348/21; 348/470; 375/265
[58] Field of Search ................... 348/21, 608, 607, 348/611, 613, 470, 484; 375/254, 285, 296,265; H04N 5/38

[56] References Cited

U.S. PATENT DOCUMENTS

| | | | |
|---|---|---|---|
| 5,086,340 | 2/1992 | Citta et al. | 348/21 |
| 5,087,975 | 2/1992 | Citta et al. | 348/21 |
| 5,181,112 | 1/1993 | Citta et al. | 348/470 |
| 5,249,200 | 9/1993 | Chen et al. | 375/285 |
| 5,258,838 | 11/1993 | Citta | 348/470 |
| 5,260,793 | 12/1993 | Citta et al. | 348/607 |
| 5,311,547 | 5/1994 | Wei | 375/18 |
| 5,408,262 | 4/1995 | Kim et al. | 348/608 |
| 5,446,758 | 8/1995 | Eyuboglu | 375/265 |
| 5,455,839 | 10/1995 | Eyuboglu | 375/265 |

*Primary Examiner*—Victor R. Kostak

[57] ABSTRACT

A digital advanced television (ATV) receiver includes a multi-tap feedforward filter for reducing NTSC co-channel interference in a received ATV signal. A complementary Tomlinson precoder is used to compensate the transmitted ATV signal for inter-symbol interference (ISI) created in the receiver by the feedforward NTSC rejection filter. Data components of the transmitted signal are non-linearly precoded while synchronization components are linearly precoded to improve sync recovery S/N performance in the receiver.

26 Claims, 4 Drawing Sheets

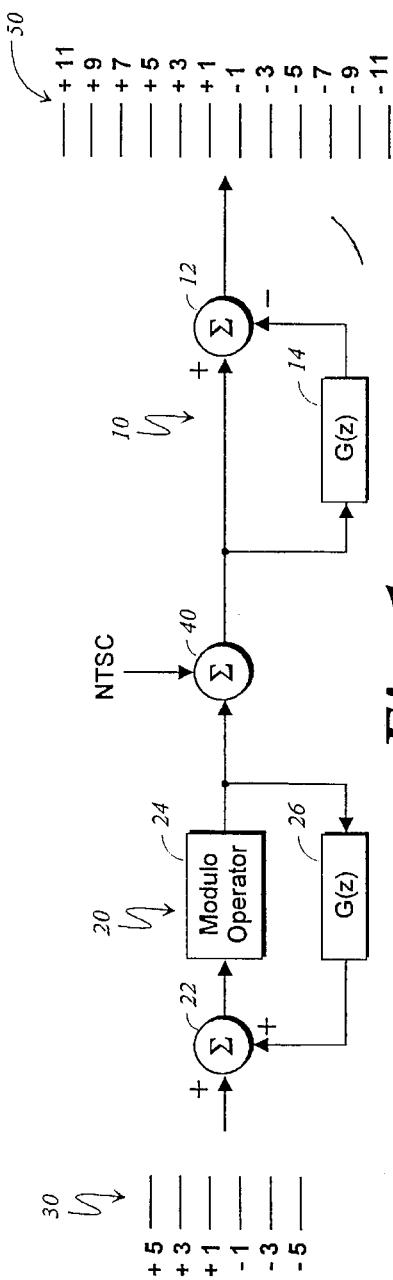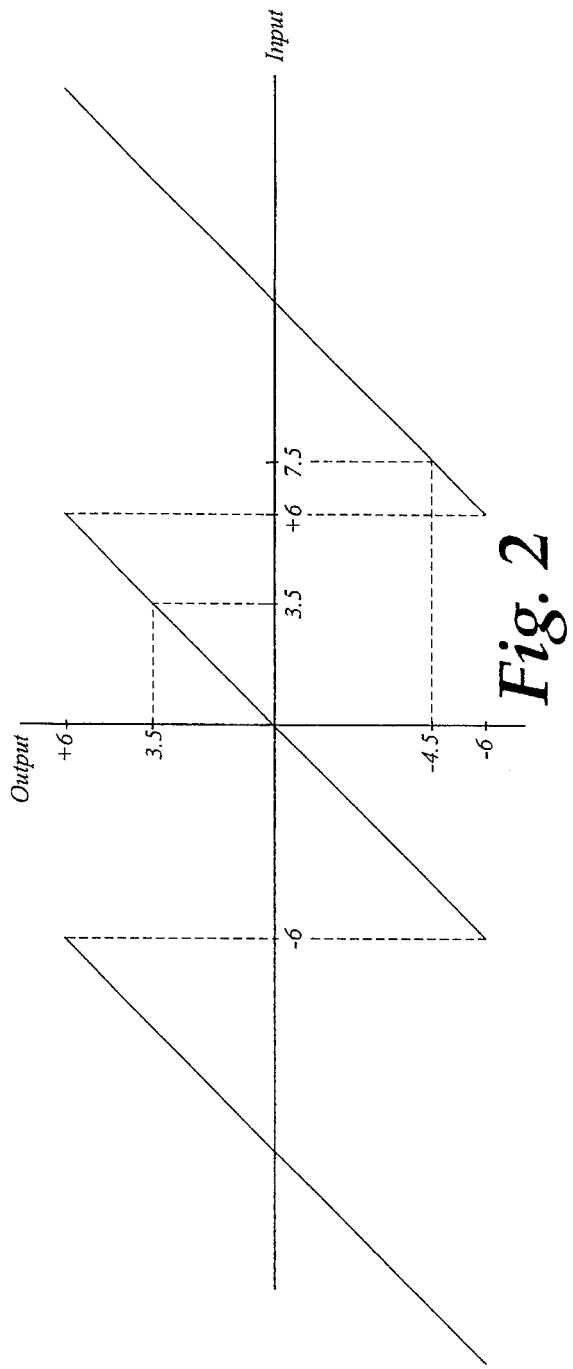

NTSC REJECTION FILTER WITH SWITCHED TOMLINSON PRECODER FOR REDUCING NTSC CO-CHANNEL INTERFERENCE IN ATV RECEIVERS

BACKGROUND OF THE INVENTION

The present invention relates generally to advanced television (ATV) services and more particularly concerns improved techniques for reducing NTSC co-channel interference in ATV receivers.

ATV is a planned U.S. terrestial broadcast television service for digitally transmitting one high definition television (HDTV) signal or a number of lower resolution television signals over a standard 6 MHz television channel. The video and audio components of the television signal or signals are compressed (using, for example, MPEG-2 and Dolby AC-3 compression respectively) and, together with an ancillary data signal, are multiplexed into a single transport bit stream for transmission as a plurality of N-level data symbols using a vestigial sideband (VSB) form of modulation. This system is fully described in a document entitled "VSB TRANSMISSION SYSTEM GRAND ALLIANCE TECHNICAL DETAILS" dated Dec. 7, 1994, which document is incorporated herein by reference.

Since ATV will broadcast over channels which were previously unused in a given local area (i.e. so-called taboo channels) and must co-exist with NTSC broadcast services for some period of time, steps have been taken to minimize the effects of co-channel ATV interference into an NTSC received signal and co-channel NTSC interference into a received ATV signal. In particular, as described in the above referenced document, the use of an appropriately configured comb filter in an ATV receiver, in conjunction with the use of a complementary precoder in the ATV transmitter, will substantially reduce co-channel NTSC interference in the received ATV signal. While the S/N ratio of the received ATV signal will also be somewhat reduced, this can be avoided by bypassing the comb filter and digitally decoding the received signal in areas where co-channel interference is not a significant problem.

It has also been proposed to employ a multi-tap (e.g. 48–52 taps) FIR filter to reduce NTSC co-channel interference in an ATV receiver together with a compensating non-linear Tomlinson precoder in the transmitter. This approach has the advantage of slightly better ATV S/N performance in the case of heavy NTSC co-channel interference but the disadvantage of poorer ATV S/N performance in cases of light or insignificant NTSC co-channel interference. In addition, the Tomlinson precoder has the further undesired effect of somewhat increasing ATV co-channel interference into a received NTSC signal and of degrading the ability of an ATV receiver to properly process the synchronization components of the received ATV signal. Such processing is necessary, for example, to control the sampling of the received digital ATV data and to control the operation of the equalizer in the ATV receiver.

It is therefore a basic object of the present invention to provide an improved system for reducing NTSC co-channel interference in an ATV receiver.

It is a more specific object of the invention to provide an improved precoder for use with a multi-tap NTSC co-channel interference rejection filter in an ATV receiver.

It is a further object of the invention to provide such an improved precoder which does not significantly degrade the performance of the synchronization signal recovery circuits of the ATV receiver.

BRIEF DESCRIPTION OF THE DRAWINGS

These and other objects and advantages of the invention will be apparent upon reading the following description in conjunction with the drawings, in which:

FIG. 1 is a simplified block diagram showing the proposed system for reducing NTSC co-channel interference in a received ATV signal;

FIG. 2 is a graph showing the transfer function of modulo operator 24 of FIG. 1;

DESCRIPTION OF THE PREFERRED EMBODIMENT

Figure 4:
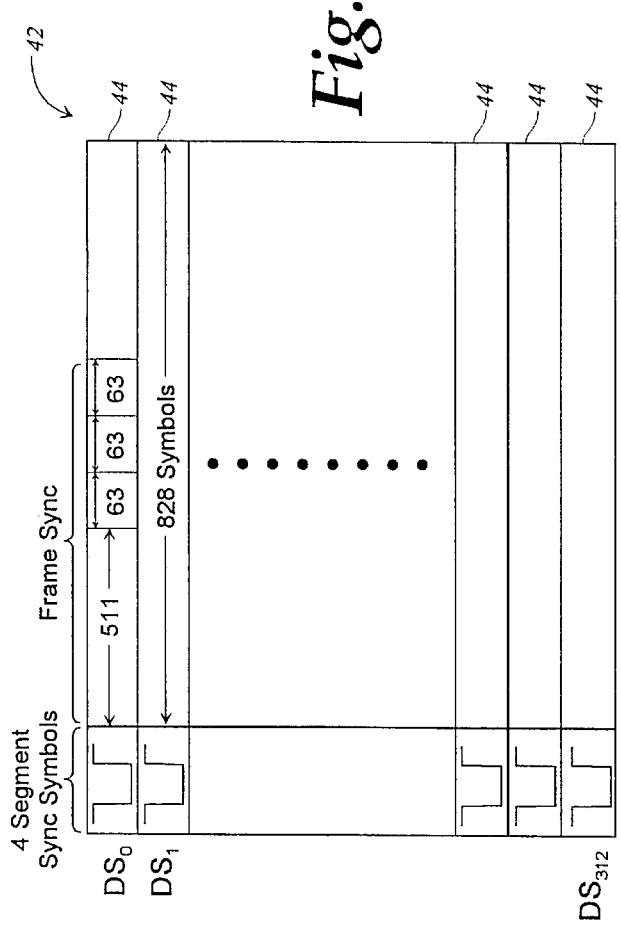
FIG. 4 illustrates the frame structure of an ATV signal.

As referred to above, it has been proposed to employ a multi-tap (e.g. 52 taps) NTSC rejection filter in a terrestial ATV receiver to reduce NTSC co-channel interference. Such an NTSC rejection filter is identified by reference numeral 10 in FIG. 1 and comprises a summer 12 having a positive input coupled for receiving the demodulated ATV signal and a negative input coupled for receiving the demodulated ATV signal through a multi-tap FIR filter 14 having a transfer function $G(Z)$. The impulse response of filter 10 is selected to provide a frequency response having relatively narrow notches at the NTSC picture and audio frequencies (and may also include a small notch at the NTSC color subcarrier frequency) to thereby attenuate the predominant energy components of the co-channel NTSC signal. However, at the same time, intersymbol interference (ISI) is introduced into the ATV data by the feed-forward connection of FIR filter 14. A Tomlinson precoder as represented by reference numeral 20 is therefore used in the encoder to compensate for the ISI introduced by filter 10. Tomlinson precoder 20 is a non-linear circuit comprising a summer 22 having a first positive input for receiving the data signal to be transmitted, a modulo operator 24 coupled to the output of summer 22 and a multi-tap FIR filter 26 having the transfer function $G(Z)$ for feeding back the output of modulo operator 24 to a second positive input of summer 12. Since the transfer function of filter 10 is $[1-G(Z)]$, ISI compensation can be effected by providing a precoder having the transfer function $[1/(1-G(Z))]$. Precoder 20 is, in fact, characterized by the latter transfer function if modulo operator 24 is disregarded. However, modulo operator 26 is necessary to reduce the relatively large peaks in the precoder frequency response at the NTSC picture and sound carriers caused by the precoder feedback. These peaks can create objectionable ATV interference into a co-channel NTSC signal and, if large enough, can lead to precoder instability.

In order to facilitate an explanation of the operation of the system of FIG. 1, consider an input signal constellation 30 applied to the input of precoder 20 having six (6) levels (+5, 3, +1, −1, −3, −5). For this example, the response of modulo operator 24 as illustrated in FIG. 2 implements the rules:

(1) If Input>6.0, subtract 12 to derive Output;

(2) If Input<−6.0, add 12 to derive Output; and (3) If −6.0<Input<6.0, then Output=Input.

Consider, for example, an input symbol value +3 to summer 22 of precoder 20 in a case where the output of filter 26 is +0.5 (the output of filter 26 is essentially random in nature). Discounting the effect of the NTSC co-channel interference introduced into the transmission channel as represented by summer 40, the output of filter 14 will also be +0.5 (since filters 14 and 26 are identical and their inputs are the same). The output of summer 22 of precoder 20 is therefore +3.5 as is the output of modulo operator 24. The value +0.5 at the output of filter 14 is subtracted from the received symbol value +3.5 to recover the original +3 symbol value at the output of receiver summer 12.

Figure 3:
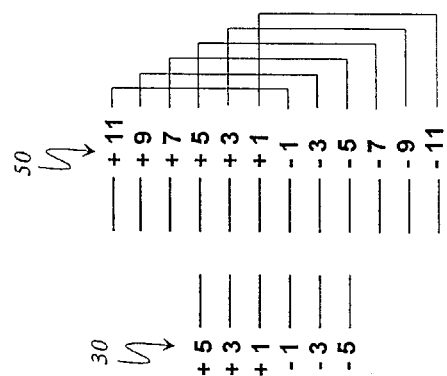
FIG. 3 is a chart illustrating input and output symbol constellations used in the system of FIG. 1.

Now consider the same input symbol value of +3, but with the output of filters 14 and 26 being +4.5. The output of summer 22 in this case is +7.5 (3.0+4.5) and the output of modulo operator 24 is −4.5 (7.5−12). In the receiver, the output +4.5 of filter 14 is subtracted from the received symbol value of −4.5 to recover a value of −9.0 at the output of summer 12. This value (−9.0) is modulo (6) equivalent to value +3.0 and can therefore be decoded by the receiver. Using a similar analysis, it can be shown that the input data constellation 30 results in an expanded data constellation 50 at the output of summer 12, with each of the original symbol values of input constellation 30 being repeated in output constellation 50 and further having a modulo (6) equivalent value as shown in FIG. 3. Multi-bit representations of the received symbols developed at the output of summer 12 can therefore be derived in relation to the symbol levels of constellation 30 by providing an appropriate expanded constellation decoder.

Referring to FIG. 4, in the Grand Alliance ATV system data is transmitted in successive data frames 42 each comprising 313 data segments 44 ($DS_o$–$DS_{312}$), with each data segment 44 comprising 832 multilevel symbols occurring at a symbol rate of about 10.76 MHz. The first segment $DS_o$ of each frame (frame sync) comprises a predetermined maximum length pseudo random reference sequence used to facilitate data recovery and as a training sequence for controlling the equalizer in the receiver. The first four (4) symbols of each data segment (segment sync) comprise a predetermined pattern of symbol values and are also used to facilitate data recovery in the receiver. The frame sync and segment sync are transmitted as rugged 2-level symbols while data is transmitted in the form of N-level symbols, where N is an integer equal to at least 4 and preferably to 6 or 8.

With reference to the example of FIG. 1, assume that the symbol levels used for frame and segment sync are +3 and −3. The received sync symbol level +3 can therefore be developed at the output of summer 12 as level +3 or its modulo (6) equivalent value −9 and the received sync symbol level −3 can be developed as −3 or its modulo (6) equivalent value +9 (see FIG. 3).

An ATV receiver preferably includes a clock recovery circuit responsive to segment sync for controlling sampling of the received digital data signal and an equalizer which is controlled in response to a signal derived by using the frame sync as a training signal. However, when a segment or frame sync symbol is reproduced at the output of summer 12 at one of the outer levels of constellation 50 (e.g. +9 or −9), the resulting signal spikes cause the receiver sync recovery circuits to ring thereby introducing ISI into the subsequently received sync symbols. This reduces the S/N performance of the sync recovery circuits which may adversely effect the operation of, among others, the receiver clock recovery and equalizer circuits.

Figure 5:
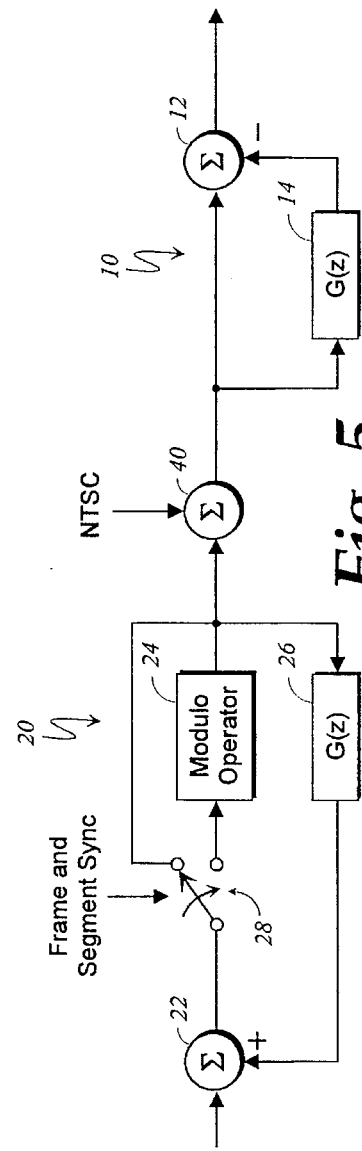
FIG. 5 is a simplified block diagram showing a modification of the system of FIG. 1 according to the invention.

These problems are addressed according to the present invention as shown by the modified circuit of FIG. 5. In particular, during the frame and segment sync intervals of the transmitted signal (see FIG. 4) a switch 28 in precoder 20 is operated to by-pass modulo operator 24 so that the precoder is operated in a linear mode. In this mode the input constellation 30 is mirrored at the output of receiver filter 10, with no equivalent values being produced as in the case of the system of FIG. 1. Therefore, a +3 sync symbol level will always be reproduced as a +3 symbol value at the output of receiver summer 12 and a −3 sync symbol level as a −3 value. This result is achieved because the composite transfer function of precoder 20 (with modulo operator 24 bypassed) and NTSC rejection filter 10 is unity. The ringing problem and the resulting ISI during sync intervals described above is therefore avoided and better S/N performance is achieved.

As previously indicated, significant ATV interference into an NTSC co-channel signal and, ultimately, precoder instability may result when the precoder is operated in the linear mode described above. However, since this mode is effective only during sync intervals, the predetermined sync patterns can be chosen to minimize any serious effects. In particular, the segment and frame sync signals should be selected to produce substantially uniform energy across the spectrum of a 6 MHz television channel so that the energy at the peaks of the precoder frequency response (i.e. the NTSC picture and sound carrier frequencies) is a relatively small fraction of the total energy. Also, the segment and frame sync signals should be selected so that the energy in respective narrow bands about the NTSC picture and sound carrier frequencies is distributed uniformly in time. The segment and frame sync signals of the Grand Alliance ATV system generally meet these criteria. This of course, cannot be done during data intervals which are presumed to be random in nature and must therefore include modulo operator 24.

Figure 8A:
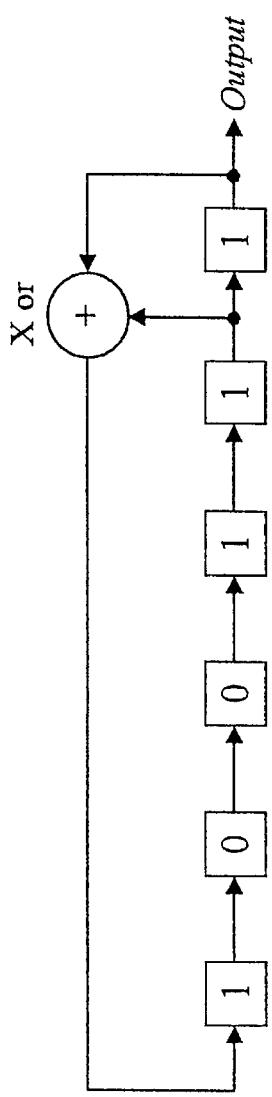
FIG. 8A and 8B are block diagrams of generators for generating the 63 and 511 symbol sequences respectively of the frame synchronization signal shown in FIG. 4.
Figure 8B:
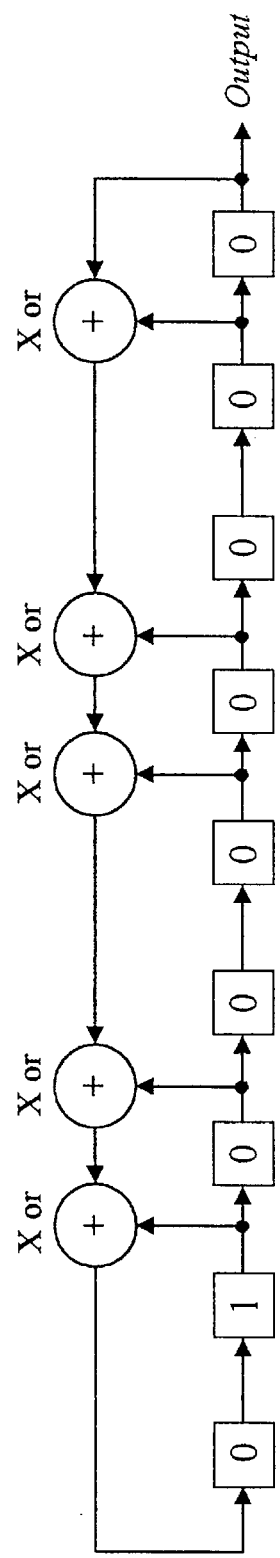

The structure of the data segment and frame synchronization signals are shown in FIGS. 4, and 8A and 8B. As indicated previously, both synchronization signals comprise rugged two-level symbols having levels such as +3 and −3 in relation to the constellations of FIG. 1. Referring to FIG. 4, the data segment synchronization signal comprises four successive symbols at the beginning of each data segment having the relative values 1,0,0,1. Thus, in terms of the constellations of FIG. 1, each data segment synchronization signal comprises four successive symbols having the respective values +3, −3, −3, +3. The frame synchronization signal comprises a first 511 symbol pseudo random maximum length sequence followed by a 63 symbol pseudo random maximum length sequence repeated three times. The middle 63 symbol sequence is preferably inverted every other frame. These sequences may be produced by the generators shown in FIGS. 8A and 8B. The generator of FIG. 8A comprises a series of six shift registers and one Exclusive-Or circuit which, when preloaded with the sequence 100111 as shown and clocked at the symbol rate, produces the 63 symbol sequence shown in FIG. 4. Similarly, the generator of FIG. 8B comprises a series of nine shift registers and five Exclusive-Or circuits which, when preloaded with the sequence 010000000 as shown and clocked at the symbol rate, produces the 511 symbol sequence shown in FIG. 4.

Figure 6:
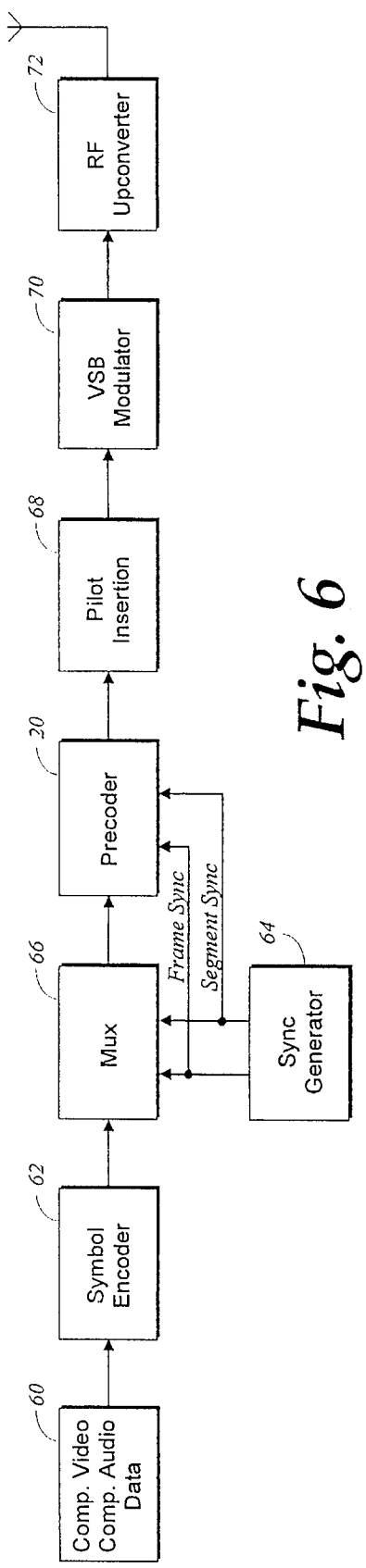
FIGS. 6 and 7 are block diagrams showing the modified system of FIG. 5 incorporated into an ATV transmitter and receiver respectively.
Figure 7:
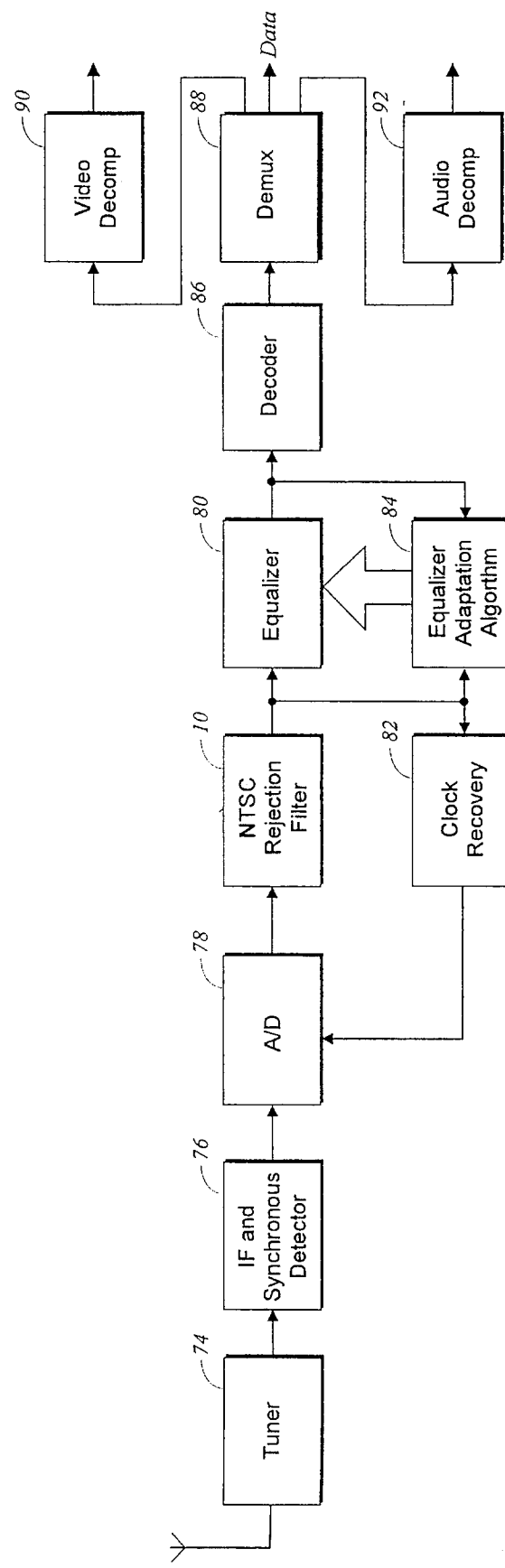

FIGS. 6 and 7 illustrate how modified precoder 20 and NTSC rejection filter 10 of FIG. 5 may be incorporated in an ATV transmitter and receiver, respectively. Referring first to FIG. 6, an ATV transmitter comprises a source 60 of compressed video, compressed audio and ancillary data, provided as an output multiplexed transport bitstream. The compressed video and audio data may represent one HDTV program or, alternatively, a number of lower resolution television programs. The multiplexed transport bitstream from source 60 is converted to a corresponding stream of data symbols, for example according to the 6-level symbol constellation 30 of FIG. 1, at a symbol rate of about 10.76 MHz by a symbol encoder 62. A sync generator 64 provides 2-level segment and frame sync symbols which are multiplexed with the data symbols by a multiplexer 66 to provide successive output frames as illustrated in FIG. 4. The frames of multiplexed data and sync symbols are applied to one input of modified precoder 20 which is controlled in response to the segment and frame sync signals from generator 64 to switch between its non-linear and linear modes during data and sync intervals respectively as illustrated in FIG. 5. The precoded frames may be offset by a small D.C. pilot component in a pilot insertion circuit 68 and then applied to a VSB modulator 70 and an RF upconverter 72 for transmission over a selected 6 MHz television channel.

Referring now to FIG. 7, the received signal is applied by a tuner 74 in the receiver to an IF and synchronous detector circuit 76. The output of circuit 76 comprises a baseband analog signal which is sampled by an A/D converter 78 to recover the transmitted data and sync symbols. The recovered symbols are applied to NTSC rejection filter 10 to reduce any co-channel NTSC interference, with the filtered data signals then being applied to a channel equalizer 80 for reducing ghosts and other channel distortions. The data symbols processed by equalizer 80 conform to the expanded symbol constellation 50 of FIG. 1. The output of NTSC rejection filter 10 is also applied to a symbol clock recovery circuit 82 and to one input of an equalizer adaptation algorithm circuit 84, which also receives a second input from the output of equalizer 80. Clock recovery circuit 82 is responsive to the segment sync symbols, which are restricted to the two levels +3 and −3 due to the linear operation of precoder 20 during sync intervals, for generating a symbol clock signal which is properly phased for operating A/D converter 78 for accurately recovering the data and sync symbols. Circuit 84 is responsive to the frame sync symbols, which are also restricted to the levels +3 and −3 as described above, for adaptively controlling equalizer 80 for equalizing degradations of the channel, including time varying degradations.

The equalized data symbols developed at the output of equalizer 80 are applied to a decoder 86 which, in addition to various error correction operations, converts the data symbols back to data bits corresponding to the output of source 60 (see FIG. 6). The data bits supplied by decoder 86 are demultiplexed by a demultiplexer 88 into a video stream, an audio stream and a data stream. The video and audio streams are applied to respective video and audio decompression circuits 90 and 92 and therefrom to suitable video and audio reproduction devices (not shown).

It is thus seen that an improved method and apparatus for reducing NTSC co-channel interference in a received digital ATV signal has been described. It will be appreciated that numerous changes in the described embodiment of the invention will be apparent to those skilled in the art without departing from its true spirit and scope. The invention is to be limited only as defined in the claims.

I claim:

1. Apparatus for precoding a digital signal comprising:
   means for providing said digital signal in the form of a multiplexed stream of synchronization and data symbols; and
   precoding means for linearly precoding only said synchronization symbols and non-linearly precoding only said data symbols.

2. Apparatus according to claim 1 including means for transmitting said precoded synchronization and data symbols over a selected channel characterized by interference components at one or more predetermined frequencies, said synchronization symbols comprising a sequence of symbols selected for producing substantially uniform transmission energy across the spectrum of said channel and which, in relatively narrow frequency bands about said interference components, is distributed substantially uniformly in time.

3. Apparatus according to claim 2 wherein said interference components comprise the picture and audio carriers of a co-channel NTSC television signal.

4. Apparatus according to claim 1 wherein said synchronization symbols comprise two-level symbols and said data symbols comprise N-level symbols where N is an integer equal to or greater than 4.

5. Apparatus according to claim 4 wherein said providing means comprises means for providing said digital signal in the form of successive frames each comprising a plurality of data segments, each of said data segments including a data segment synchronization signal comprising a predetermined number of said synchronization symbols and one of said data segments in each of said frames comprising a frame synchronization signal comprising a plurality of said synchronization symbols.

6. Apparatus according to claim 5 including means for transmitting said precoded synchronization and data symbols over a selected television channel characterized by interference components comprising the picture and audio carriers of a co-channel NTSC television signal, each of said data segment and frame synchronization signals comprising a sequence of symbols selected for producing substantially uniform transmission energy across the spectrum of said channel and which, in relatively narrow frequency bands about said interference components, is distributed substantially uniformly in time.

7. Apparatus according to claim 1 wherein said precoding means comprises a modulo operator and means for bypassing said modulo operator for linearly precoding said synchronization symbols.

8. Apparatus according to claim 7 wherein said precoding means comprises a summer having a first input for receiving said digital signal, a filter for coupling the output of said modulo operator to a second input of said summer and a switch for coupling the output of said summer to a) the input of said modulo operator for non-linearly precoding said data symbols and b) to the output of said modulo operator for linearly precoding said synchronization symbols.

9. Apparatus for precoding a digital signal comprising:
   means for providing said digital signal in the form of a succession of data frames each including a plurality of data segments, each of said data segments comprising a predetermined number of two-level data segment synchronization symbols and a plurality of N-level data symbols, where N is an integer greater than or equal to 4, and one of said data segments in each of said data frames comprising a plurality of two-level frame synchronization symbols; and
   precoding means including a modulo operator for non-linearly precoding said N-level data symbols and means for bypassing said modulo operator for linearly precoding said two-level data segment and frame synchronization symbols.

10. Apparatus according to claim 9 including means for transmitting said precoded synchronization and data symbols over a selected television channel characterized by interference components comprising the picture and audio carriers of a co-channel NTSC television signal, each of said data segment and frame synchronization signals comprising a sequence of symbols selected for producing substantially uniform transmission energy across the spectrum of said channel and which, in relatively narrow frequency-bands about said interference components, is distributed substantially uniformly in time.

11. A receiver for receiving a digital signal comprising:
means for receiving and developing a digital signal comprising a multiplexed stream of only linearly precoded synchronization symbols and only non-linearly precoded data symbols; and
a filter coupled to said receiving and developing means for reducing selected co-channel interference components characterizing said received digital signal.

12. A receiver for receiving a digital signal comprising:
means for receiving and developing a digital signal comprising a multiplexed stream of only linearly precoded two-level synchronization symbols and only non-linearly precoded N-level data symbols, where N is an integer equal to or greater than 4; and
a filter coupled to said receiving means for reducing selected co-channel interference components characterizing said received digital signal and producing an output two-level synchronization symbol in response to each received two-level synchronization symbol and an output M-level data symbol, where M is an integer greater than N, in response to each received N-level data symbol.

13. The receiver of claim 12 wherein said output two-level synchronization and M-level data symbols are produced in the form of a succession of data frames each comprising a plurality of data segments, each of said data segments including a data segment synchronization signal comprising a predetermined number of said output two-level synchronization symbols and one of said data segments in each of said data frames comprising a frame synchronization signal comprising a plurality of said output two-level synchronization symbols.

14. The receiver of claim 13 including a clock recovery circuit responsive to said output two-level data segment synchronization symbols produced by said filter for generating a symbol clock signal, said means for receiving and developing including an A/D converter responsive to said symbol clock signal for developing said precoded data and synchronization symbols.

15. The receiver of claim 13 including means responsive to said output two-level frame synchronization symbols produced by said filter for generating an equalizer control signal and an equalizer responsive to said equalizer control signal for equalizing said output M-level data symbols produced by said filter.

16. A system for transmitting and receiving a digital signal comprising:
means for providing a digital signal in the form of a multiplexed stream of synchronization and data symbols;
a precoder for linearly precoding only said synchronization symbols and non-linearly precoding only said data symbols;
means for transmitting said precoded synchronization and data symbols over a selected channel;
means for receiving said transmitted signal; and
a filter for reducing selected co-channel interference components characterizing said received signal.

17. The system of claim 16 wherein said interference components occur at one or more predetermined frequencies within said channel, said synchronization symbols comprising a sequence of symbols selected for producing substantially uniform transmission energy across the spectrum of said channel and which, in relatively narrow frequency bands about said interference components, is distributed substantially uniformly in time.

18. The system of claim 17 wherein said interference components comprise the picture and audio carriers of a co-channel NTSC television signal.

19. The system of claim 16 wherein said synchronization symbols comprise two-level symbols and said data symbols comprise N-level symbols, where N is an integer greater than or equal to 4, said filter producing an output two-level synchronization symbol in response to each received two-level synchronization symbol and an output M-level data symbol, where M is an integer greater than N, in response to each received N-level data symbol.

20. The system of claim 19 wherein said providing means comprises means for providing said digital signal in the form of successive frames each comprising a plurality of data segments, each of said data segments including a data segment synchronization signal comprising a predetermined number of said two-level synchronization symbols and one of said data segments in each of said frames comprising a frame synchronization signal comprising a plurality of said two-level synchronization symbols, each of said data segment and frame synchronization signals comprising a sequence of said two-level synchronization symbols selected for producing substantially uniform transmission energy across the spectrum of said channel and which, in relatively narrow frequency bands about said interference components, is distributed substantially uniformly in time.

21. A system for transmitting and receiving a digital signal comprising:
means for providing a digital signal in the form of a succession of data frames each including a plurality of data segments, each of said data segments comprising a predetermined number of two-level data segment synchronization symbols and a plurality of N-level data symbols, where N is an integer greater than or equal to 4, and one of said data segments in each of said data frames comprising a plurality of two-level frame synchronization symbols;
precoding means for non-linearly precoding only said N-level data symbols and linearly precoding only said two-level data segment and frame synchronization symbols;
means for transmitting said precoded synchronization and data symbols over a selected channel;
means for receiving said transmitted signal, and
a filter coupled to said receiving means having a frequency response for reducing selected co-channel interference components characterizing said received signal and producing an output two-level synchronization symbol in response to each received two-level synchronization symbol and an output M-level data symbol, where M is an integer greater than N, in response to each received N-level data symbol.

22. The system of claim 21 wherein said precoding means comprises a modulo operator connected for non-linearly precoding said N-level data symbols and means for bypassing said modulo operator for linearly precoding said data segment and frame synchronization symbols.

23. The system of claim 21 wherein said data segment and frame synchronization symbols each comprise a sequence of symbols selected for producing substantially uniform transmission energy across the spectrum of said channel and which, in relatively narrow frequency bands about said interference components, is distributed substantially uniformly in time.

24. Apparatus according to claim 23 wherein said interference components comprise the picture and audio carriers of a co-channel NTSC television signal.

25. The system of claim 21 including a clock recovery circuit responsive to said output two-level data segment synchronization symbols produced by said filter for generating a symbol clock signal, said receiving means including an A/D converter responsive to said symbol clock signal for sampling said received symbols.

26. The system of claim 21 including means responsive to said output two-level frame synchronization symbols produced by said filter for generating an equalizer control signal and an equalizer responsive to said equalizer control signal for equalizing said output M-level data symbols produced by said filter.

* * * * *